United States Patent
Chen et al.

(10) Patent No.: US 7,236,207 B2
(45) Date of Patent: Jun. 26, 2007

(54) SYSTEM AND METHOD OF TRANSMISSION AND RECEPTION OF PROGRESSIVE CONTENT WITH ISOLATED FIELDS FOR CONVERSION TO INTERLACED DISPLAY

(75) Inventors: Sherman (Xuemin) Chen, San Diego, CA (US); Alexander G. MacInnis, Los Altos, CA (US)

(73) Assignee: Broadcom Corporation, Irvine, CA (US)

(*) Notice: Subject to any disclaimer, the term of this patent is extended or adjusted under 35 U.S.C. 154(b) by 456 days.

(21) Appl. No.: 10/349,634

(22) Filed: Jan. 22, 2003

(65) Prior Publication Data

US 2003/0137600 A1   Jul. 24, 2003

Related U.S. Application Data

(60) Provisional application No. 60/441,072, filed on Jan. 17, 2003, provisional application No. 60/384,234, filed on May 30, 2002, provisional application No. 60/351,182, filed on Jan. 22, 2002.

(51) Int. Cl.
H04N 7/01 (2006.01)
H04N 11/20 (2006.01)

(52) U.S. Cl. .................. 348/459; 348/446; 348/911; 348/443; 348/441

(58) Field of Classification Search ............ 348/441, 348/459, 446, 443, 445, 447, 448, 474, 473, 348/911, 97
See application file for complete search history.

(56) References Cited

U.S. PATENT DOCUMENTS

| | | | |
|---|---|---|---|
| 5,365,273 A | 11/1994 | Correa et al. ............... 348/452 |
| 5,390,135 A | 2/1995 | Lee et al. | |
| 5,446,497 A * | 8/1995 | Keating et al. ............. 348/443 |
| 5,461,420 A * | 10/1995 | Yonemitsu et al. .... 375/240.15 |
| 5,757,435 A * | 5/1998 | Wells ......................... 348/441 |
| 5,771,357 A | 6/1998 | Kato et al. ............. 395/200.77 |
| 5,781,184 A | 7/1998 | Wasserman et al. ........ 345/202 |
| 5,943,251 A | 8/1999 | Jiang et al. | |
| 5,982,444 A * | 11/1999 | Kato et al. .................. 348/446 |
| 6,069,664 A | 5/2000 | Zhu et al. | |
| 6,111,610 A * | 8/2000 | Faroudja ..................... 348/441 |
| 6,118,491 A | 9/2000 | Wu et al. | |
| 6,222,589 B1 * | 4/2001 | Faroudja et al. ............ 348/448 |
| 6,441,813 B1 * | 8/2002 | Ishibashi ..................... 345/213 |
| 6,670,996 B2 * | 12/2003 | Jiang ......................... 348/558 |
| 6,867,814 B2 * | 3/2005 | Adams et al. .............. 348/448 |

FOREIGN PATENT DOCUMENTS

EP    0762772 A    3/1997

OTHER PUBLICATIONS

"Text of Committee Draft of Joint Video Specification (ITU-T Rec. H-264 ISO/IEC 14496-10 AVC) MPEG02/N4810", ISO/IEC JTC1/SC29/WG11 MPEG02/N4810, Fairfax, USA, May 2002, pp. 1-, 1, XP001074690.

Inoue et al, "An Area-Effective Datapath Architecture for Embedded Microprocessors and Scalable Systems", IEICE Transactions on Electronics, Institute of Electronics Information and Comm. Eng., Tokyo, JP, vol. E84-C No. 8, Aug. 2001, pp. 1014-1020, XP001107636 ISSN: 0916-8524.

* cited by examiner

*Primary Examiner*—Michael Lee
*Assistant Examiner*—Jean W. Désir
(74) *Attorney, Agent, or Firm*—McAndrews, Held & Malloy, Ltd.

(57) ABSTRACT

Systems and methods of coding progressive content with isolated fields for conversion to interlaced display are provided. Some systems and methods may find use in, for example, digital video compression systems and methods. Film material may be encoded as video material with an intended field polarity and an explicit 3:2 pull-down operation for interlaced display (e.g., a 30-frames-per-second display).

29 Claims, 7 Drawing Sheets

Replacement Drawing

| Film mode states | Transmitted Fields | Repeat First Field Flag | Top Field First Flag | Displayed Field |
|---|---|---|---|---|
| A | A1 | 0 | 1 | A1 |
|   | A2 |   |   | A2 |
| B | B1 | 1 | 1 | B1 |
|   | B2 |   |   | B2 |
|   |   |   |   | B1 |
| C | C1 | 0 | 0 | C2 |
|   | C2 |   |   | C1 |
| D | D1 | 1 | 0 | D2 |
|   | D2 |   |   | D1 |
|   |   |   |   | D2 |

FIG. 2
(Prior Art)

| Film Mode States | A | B | C | D |
|---|---|---|---|---|
| Field with Parity | a1  a2 | b1  b2 | c1  c2 | d1  d2 |
| Coded Frame/Field | A' | B'  b1 | C' | D'  d2 |

SYSTEM AND METHOD OF TRANSMISSION AND RECEPTION OF PROGRESSIVE CONTENT WITH ISOLATED FIELDS FOR CONVERSION TO INTERLACED DISPLAY

RELATED APPLICATIONS

This application makes reference to, claims priority to and claims benefit from U.S. Provisional Patent Application Ser. No. 60/351,182, entitled "Method for Enabling Transmission and Display of Encoded Compressed Film Material in a Video Bit Stream" and filed on Jan. 22, 2002; U.S. Provisional Patent Application Ser. No. 60/384,234, entitled "Method for Enabling Transmission and Display of Encoded Compressed Film Material in a Video Bitstream" and filed on May 30, 2002; and U.S. Provisional Patent Application Ser. No. 60/441,072, entitled "Method for Enabling Transmission and Display of Encoded Compressed Film Material in a Video Bit Stream" and filed on Jan. 17, 2003.

INCORPORATION BY REFERENCE

The above-identified United States patent applications are hereby incorporated herein by reference in their entirety.

BACKGROUND OF THE INVENTION

In countries that use 525-line interlaced display systems such as, for example, the United States and Canada, television video signals are sampled and transmitted at approximately 59.94 fields per second (fps). For such countries, digital television video streams are generally encoded and transmitted by using a particular Moving Pictures Experts Group (MPEG) standard (e.g., MPEG-2 Video) at approximately 29.97 frames per second (FPS).

Hereinafter, an integral value of fps or an integral value of FPS may be an approximation including, within its scope, a range of equivalent values. Thus, for example, the expression 30 FPS may be used to refer to rates such as, for example, approximately 29.97 FPS or approximately 30 FPS. Furthermore, the expression 24 FPS may be used to refer to rates such as, for example, approximately 23.976 FPS or approximately 24 FPS. Similarly, the expression 60 fps may be used to refer to rates such as, for example, approximately 59.94 fps or approximately 60 fps.

Film material produced at 24 FPS is routinely converted to 60 fps in many applications. Broadcast networks usually encode and transmit movies that were originally filmed at 24 FPS and not at 60 fps. However, at the receiver, the decoded video at 24 FPS is often converted to 60 fps for interlaced display. A conventional process for converting 24 FPS to 60 fps sampling includes the Telecine Process (named after the original type of machine used to perform the conversion from film to video). It is also known as the 3:2 pull-down process. The Telecine Process inserts repeated fields derived from the original film frames in such a way that 5 video frames (i.e., 10 fields) are produced for every 4 original film frames. FIG. 1 illustrates one example of a process 12 that performs a 3:2 pull-down. The original film sequence 10 filmed at 24 FPS is converted to a video sequence 14 at 30 FPS, or equivalently 60 fps. A mechanism of handling 3:2 pull-down for film material in digital video systems is usually referred as film mode.

The Telecine Process or 3:2 pull-down process is supported in the MPEG-2 Video compression standard. When using the MPEG-2 Video standard with the film mode, the frame rate encoded in the sequence header is 30 FPS for interlaced display, even though the video is actually coded as a 24 FPS film sequence. The encoder also conveys, to the decoder, proper display timing based on the frame rate of 30 FPS. The flags top_field_first and repeat_first_field in the picture coding extension header are used for indicating how a picture should be displayed. These two flags are mandated as MPEG-2 syntax elements that are carried all the time and are followed by decoder. However, such inflexibility may not be desirable, particularly, when the type of display device can vary from, for example, an interlaced television to a progressive monitor. Furthermore, the encoder does not know the type of display employed at the decoder end.

In MPEG-2 Video elementary streams, the flags top_field_first and repeat_first_field are used to indicate the current film state. Four film states A, B, C and D are illustrated in FIG. 1. The four possible film mode states are generally repeated in the same order every four pictures. FIG. 2 illustrates the mapping between the film states and these 3:2 pull-down flags in MPEG-2 Video.

In MPEG-2, the decoder generally follows the top_field_first and repeat_first_field flags to display film state B and D frames for three field times to re-construct the 3:2 pull-down pattern. The decoder re-displays the first field to create the third field. This is because, in the 3:2 pull-down algorithm, the first field is repeated every other picture to convert film material at 24 FPS to video mode at 30 FPS. Film state A and C pictures are displayed for only two field times. A film mode sequence of four pictures will therefore be displayed as a total of 10 field times. In this way, the decoded video is displayed at the correct video picture rate of 30 FPS In MPEG-2, the flags top_field_first and repeat_first_field along with the frame rate can also be applied to derive Decoding Time Stamps (DTS) and Presentation Time Stamps (PTS) for some pictures. The flags (i.e., top_field_first and repeat_first_field) are used to achieve proper timing for decoding and displaying the coded 24 FPS film material to generate output video at 30 FPS.

However, for compressed video formats without these flags (or similar flags), the 3:2 pull-down process or the film mode is supported in a different manner and not supported by, for example, new video compression standards (e.g., MPEG-4 Advanced Video Coding (AVC)) as well as with some of the existing video transport standards (e.g., MPEG-2 Systems).

In formats other than those following the MPEG-2 Systems standard (i.e., ISO/IEC 13818-1), decoding time and presentation time may be indicated via syntax elements that differ from DTS specifications and PTS specifications found in MPEG-2 Systems. As used herein, the terms DTS and PTS may be interpreted as including, within their meaning, decoding time or buffer removal time and presentation time or display time, respectively, regardless of how they may be encoded in the bitstream.

Further limitations and disadvantages of conventional and traditional approaches will become apparent to one of ordinary skill in the art through comparison of such systems with some aspects of the present invention as set forth in the remainder of the present application with reference to the drawings.

BRIEF SUMMARY OF THE INVENTION

Some aspects of the present invention may relate to a system and a method of encoding progressive content with isolated fields for conversion to interlaced display. Some applications within the scope of the present invention may find use, for example, in digital video compression systems and methods.

In one embodiment, the present invention may provide an encoder that is adapted to encode film material as video with an intended field polarity and an explicit 3:2 pull-down operation for interlaced display (e.g., a 30 FPS display). An isolated field with the intended field polarity (e.g., top field) may be coded between two frames to achieve 3:2 pull-down for coding the film material. The polarities of all fields of all frames may be inferred from the field polarities of the isolated fields since the field polarities alternate for normal interlaced display of video. Frames do not have to indicate field polarities; however, they may do so in video coding standards that support the indication of field polarity of frames. The field polarities of the frames may be implied by the polarities of the isolated fields.

In another embodiment, unlike in MPEG-2 Video, for example, the present invention may provide that DTS and PTS may be generated for both coded frames and fields in the encoder. The encoder may insert isolated fields as appropriate to achieve the desired decoding and display timing, for example, according to the result of a 3:2 pull-down process. In cases where the input to the encoder is the result of a 3:2 pull-down process, the encoder may encode progressive frames with interspersed isolated fields in a manner similar to the content that is received by the encoder. In the decoder, for coded pictures (e.g., frame pictures or field pictures) that do not have associated DTS and PTS in the stream, their decoding and presentation times may be derived from the decoding and presentation times of previous pictures (e.g., frame pictures or field pictures) by using the frame rate or the field rate indicated in the steam. In one example, the decoding and presentation times may be derived from the decoding and presentation times of previous pictures by using only the frame or the field rate indicated in the stream.

In yet another embodiment, unlike the MPEG-2 film mode flags, for example, the present invention may provide that its use does not complicate the video buffer model in the Hypothetical Reference decoder portion of the video standard, since the frame rate and buffer removal times are consistent with or without the use of film mode encoding.

These and other features and advantages of the present invention may be appreciated from a review of the following detailed description of the present invention, along with the accompanying figures in which like reference numerals refer to like parts throughout.

BRIEF DESCRIPTION OF THE DRAWINGS

FIG. 2 illustrates an embodiment of a mapping between film mode states and 3:2 pull-down flags.

FIG. 3 illustrates an embodiment of a pattern of frames and fields according to the present invention.

DETAILED DESCRIPTION OF THE INVENTION

Some aspects of the present invention may relate to a system and a method that encodes progressive content with isolated fields for conversion to interlaced display. Some applications within the scope of the present invention may find use in, for example, digital video compression systems and methods. Some embodiments according to the present invention may be suitable for use in and compatible with some MPEG standards (e.g., an MPEG-4 AVC standard as described in, for example, document JVT-E146d37ncm.doc, entitled "Joint Video Specification (ITU-T Rec. H.264|ISO/IEC 14496-10 AVC)", incorporated herein by reference in its entirety).

Some aspects of the present invention may relate to providing a system and a method that realizes a 3:2 pull-down process or a film mode for at least some video compression systems and methods. Some embodiments according to the present invention may be suitable for use in and compatible with some MPEG standards (e.g., MPEG-4 AVC) including some existing video transport standards (e.g., MPEG-2 Systems).

Figure 4:
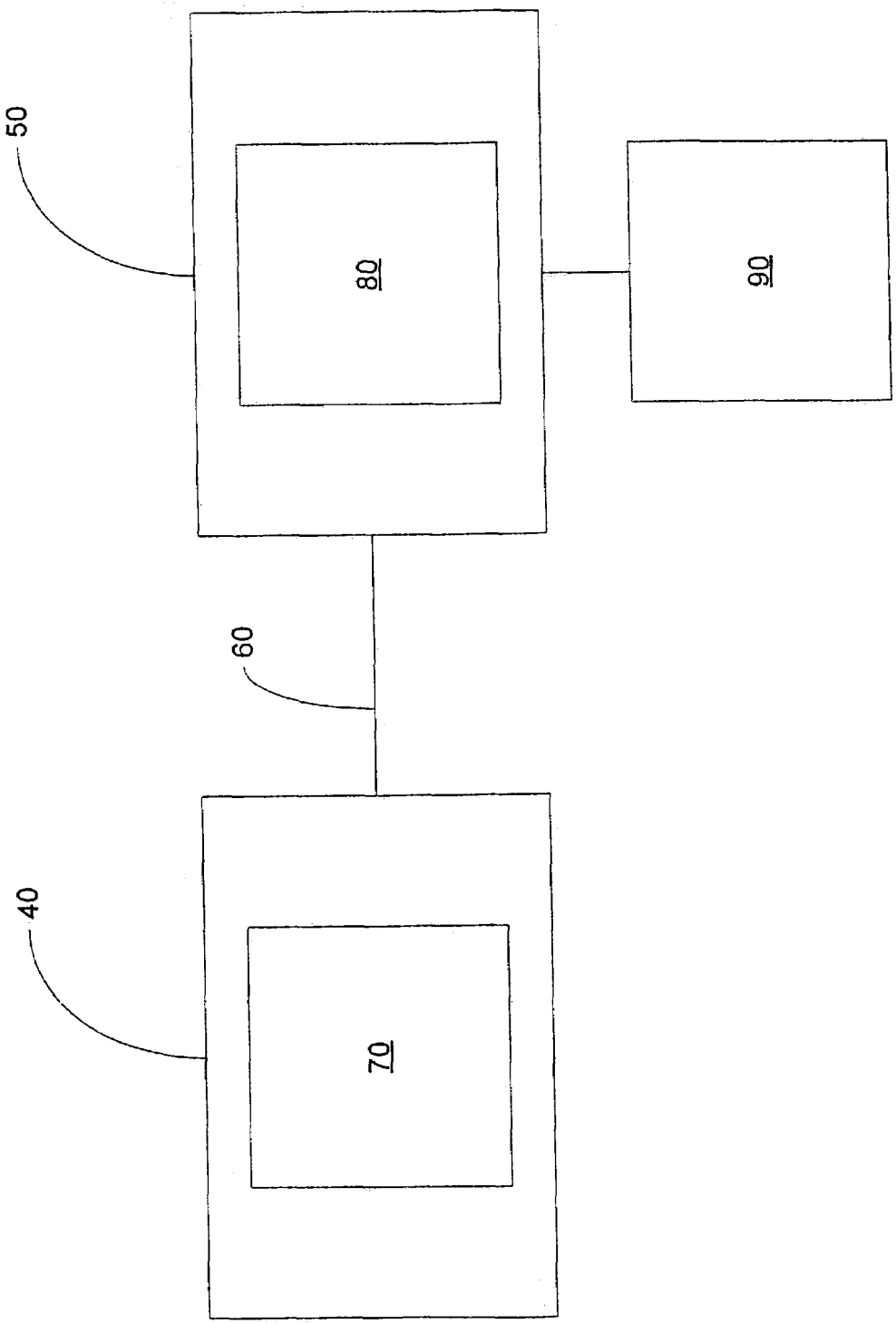
FIG. 4 illustrates an embodiment of a system that facilitates the display of video according to the present invention.
Figure 5:
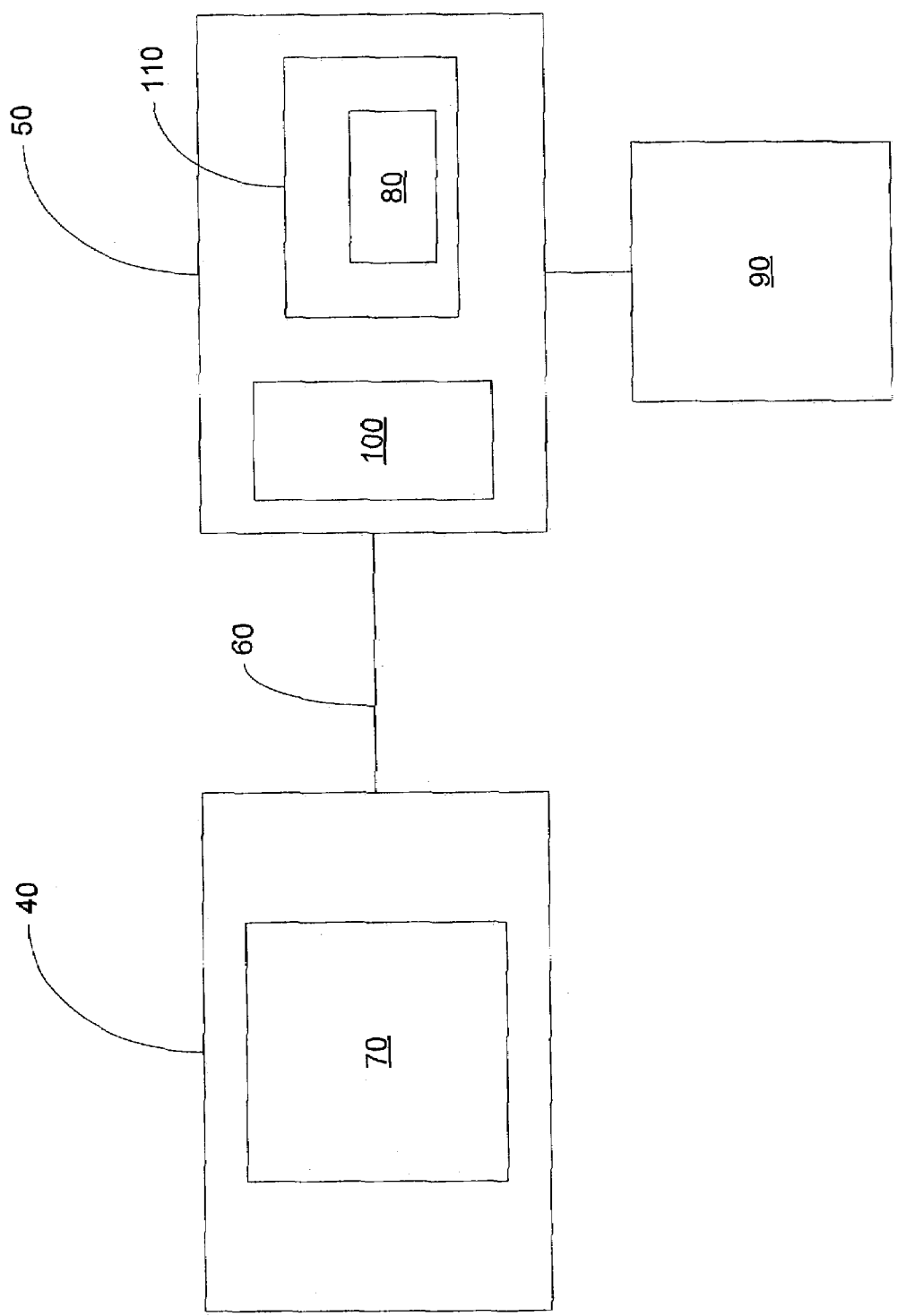
FIG. 5 illustrates an embodiment of a system that facilitates the display of video according to the present invention.

FIGS. 4 and 5 show respective block diagrams illustrating embodiments of systems that facilitate the display of video according to the present invention. Referring to FIG. 4, a transmitter 40 may be coupled to a receiver 50 via a network 60. The receiver 50 may, in turn, be coupled to a display 90. The transmitter 40 may include, for example, an encoder 70. The receiver 50 may include, for example, a decoder 80. FIG. 5 shows another embodiment for the receiver 50 including, for example, a transport processor 100 and a multimedia processor 110. In one embodiment, the transport processor 100 may be coupled to the network 60 and to the multimedia processor 110. The multimedia processor 110 may be coupled to the display 90 and may include, for example, the decoder 80. Although illustrated as part of the multimedia processor 110, the decoder 80 may be separate from the multimedia processor 110. Furthermore, although illustrated as separate components, the transport processor 100 and multimedia processor 110 may be integrated at least in part. In one embodiment, the transport processor 100 and the multimedia processor 110 form a single integrated chip. The present invention contemplates other degrees of integration and separation.

Figure 6:
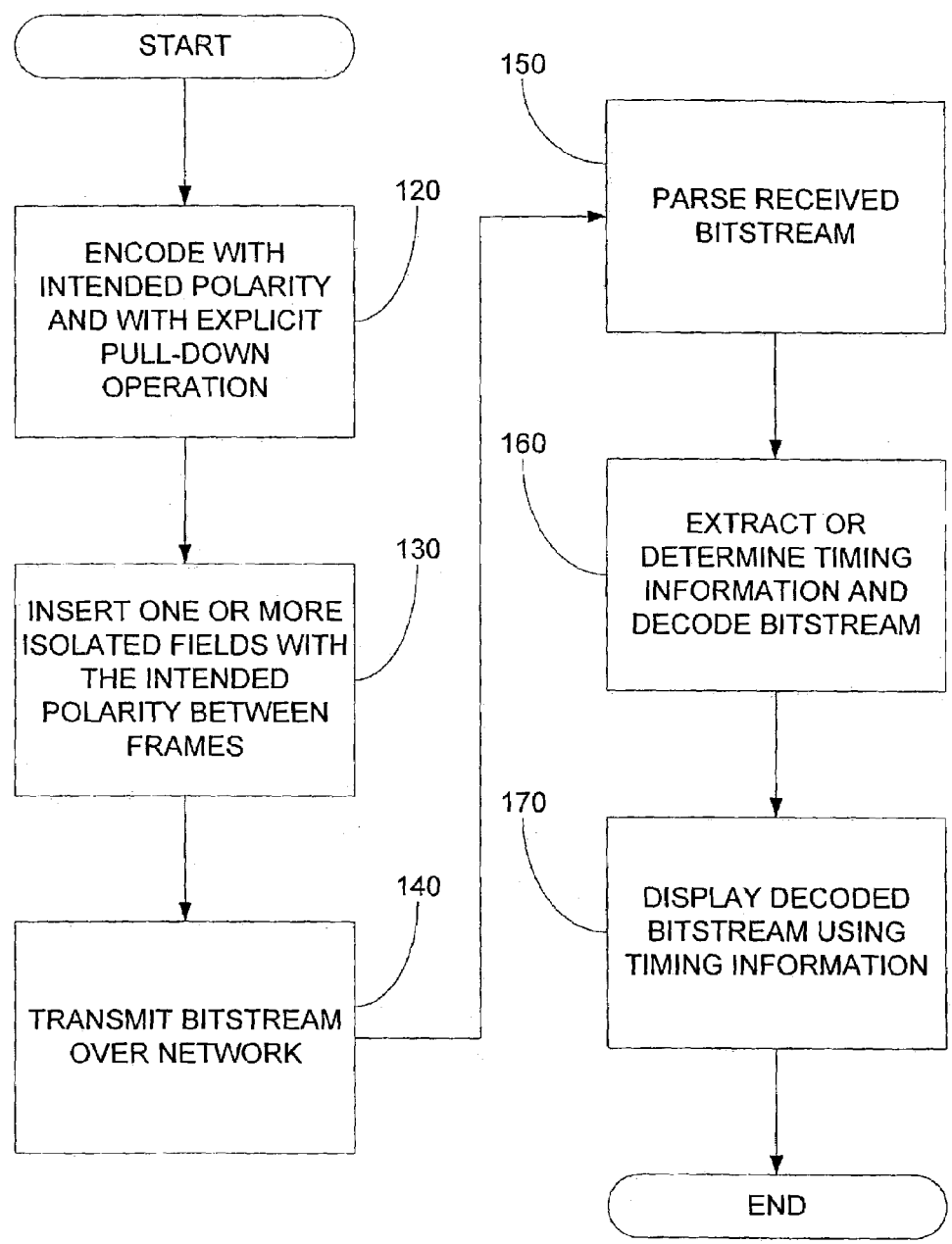
FIG. 6 illustrates a flowchart showing an embodiment of a process that facilitates the display of video according to the present invention.

FIG. 6 illustrates a flowchart showing an embodiment of a process that facilitates the display of video according to the present invention. In operation, in step 120, the encoder 70 of the transmitter 40 may encode, for example, film material as video material with an intended field polarity and with an explicit 3:2 pull-down operation for interlaced display via the display 90. In step 130, the encoder 70 may insert one or more isolated fields with the intended field polarity (e.g., a top field or a bottom field) between two frames to achieve 3:2 pull-down for coding the film material. The field polarities of the fields in all of the frames may be inferred from the field polarities of the isolated fields. In one embodiment, this may be because, for example, the field polarities alternate for normal interlaced video display. In step 140, the bitstream (e.g., a video bitstream) may be transmitted over a network (e.g., cable television, satellite, digital television, broadcast, Ethernet, Internet, wireless network, etc.) to the receiver 50. In step 150, the transport processor 100 may parse the received bitstream and may output the parsed bitstream to the multimedia processor 110. In step 160, the multimedia processor 110, which may include, for example, the decoder 80, may extract or may determine timing information and may decode the bitstream. If not present, the timing information for a particular frame or a particular field may be determined from the timing information from one or more previous frames or one or more previous fields. The multimedia processor 110 may use a frame rate or field rate indicated in the bitstream to determine timing information for a particular frame or a particular field. In step 170, the decoded bitstream may then be displayed on the display 90 using, for example, the extracted or determined timing information. For example, the multimedia processor 110 may use the time stamp information in determining the timing for displaying pictures (e.g., frame pictures, field pictures, etc.)

Compressed digital video may include, for example, coded frames and coded fields. According to the MPEG-2 Video standard (i.e., ISO 13818-2), coded fields occur in pairs (i.e., an isolated field is not allowed between two frames). Furthermore, each picture of a film mode sequence in MPEG-2 is always coded as a frame. In one embodiment, the isolated fields may be used to code some pictures in film mode. In another embodiment, the present invention may be used with the MPEG-4 AVC standard. An isolated field with the indicated field polarity (e.g., top field or bottom field) may be coded between, for example, two frames to achieve the 3:2 pull-down process for coding film material. The frames may or may not have the field order indicated explicitly. The order of the fields of the frames may be implied, for example, by the polarity of the isolated fields.

Figure 1:
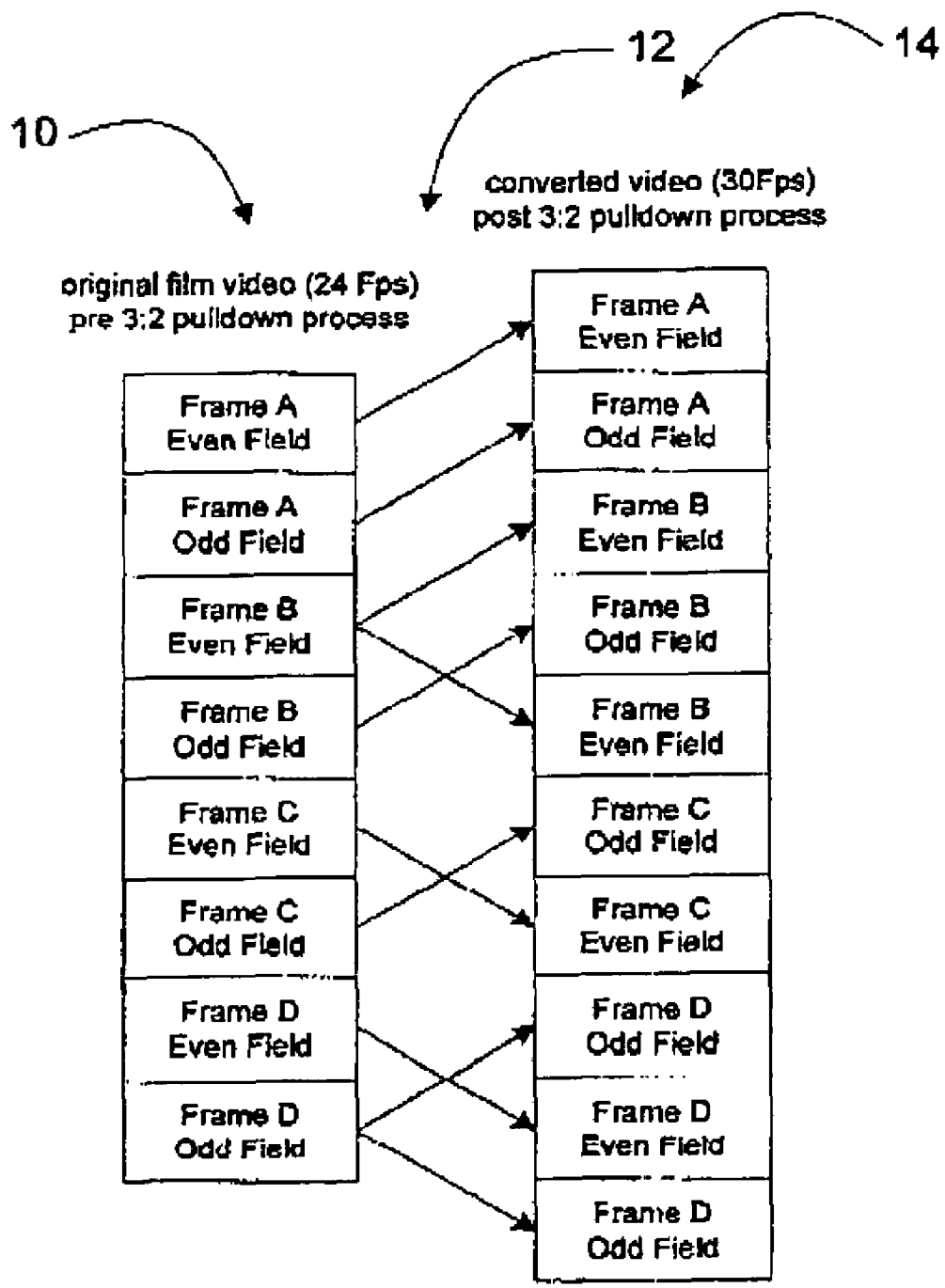
FIG. 1 illustrates an embodiment of a 3:2 Pull Down process.

The film mode states correspond, for example, to frame types A, B, C and D of the 3:2 pull-down process as illustrated in FIGS. 1 and 2. An embodiment of the operation of an encoder according to the present invention is illustrated in FIG. 3. For film mode state A, a picture 20 is coded as a frame whose top field precedes its bottom field in time. For film mode state B, a first picture 22 is coded as a frame whose top field precedes its bottom field in time followed by a second picture 24 coded as a field. The coded field in the second picture 24 represents the top field of the film mode state B. In one embodiment, it is predicted from the top field of the preceding frame picture in state B. For film mode state C, a picture 26 is coded as a frame whose bottom field precedes its top field in time. For film mode state D, a first picture 28 is coded as a frame whose bottom field precedes its top field in time followed by a second picture 30 coded as a field. This coded field represents the bottom field of the film mode state D. In one embodiment, it is predicted from the bottom field of the preceding frame picture in state D.

Figure 7:
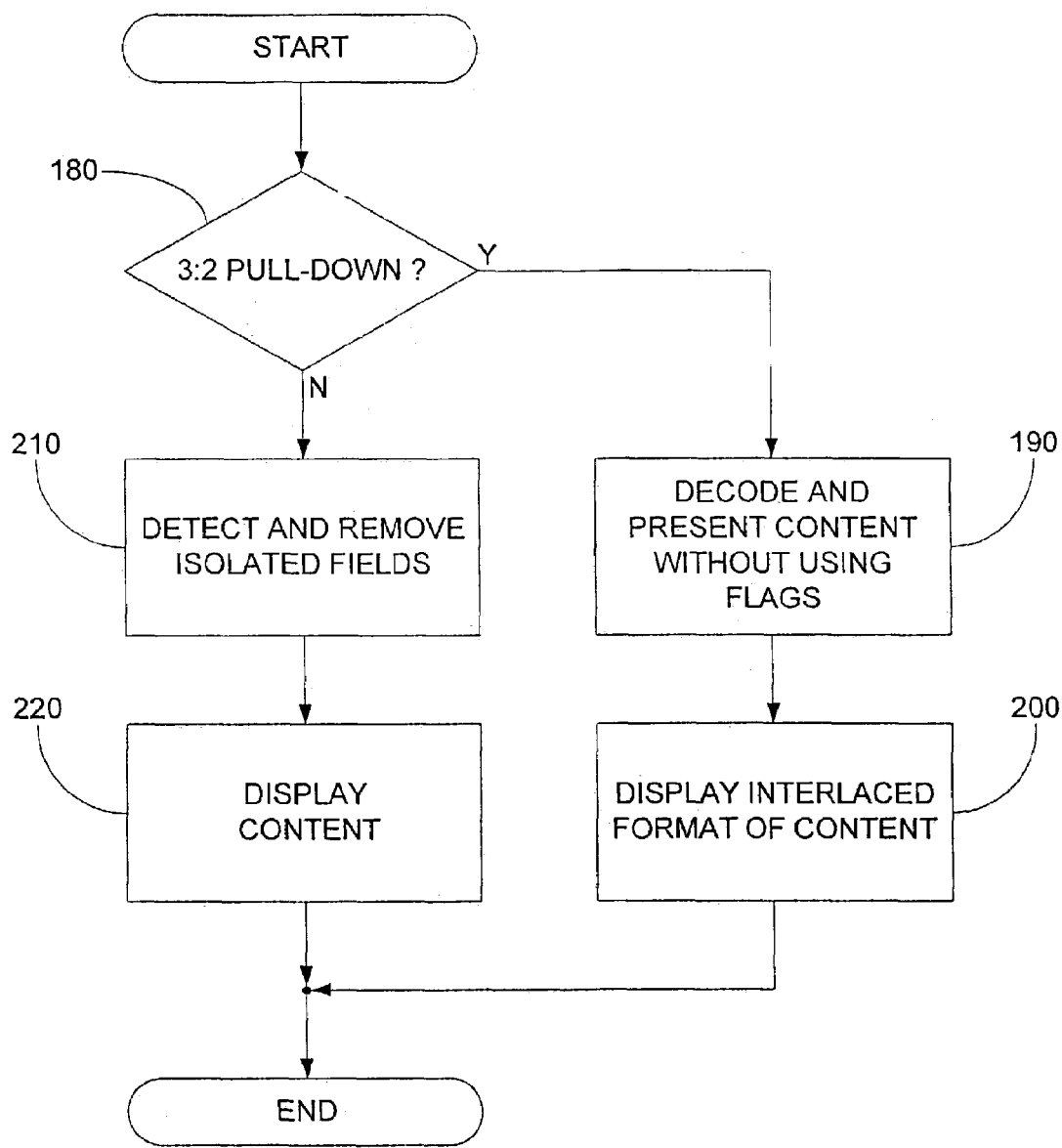
FIG. 7 illustrates a flowchart showing an embodiment of a decoding process according to the present invention.

Some embodiments of encoding and decoding methods for film mode according to the present invention may be well suited for supporting interlaced display. FIG. 7 shows a flowchart illustrating an embodiment of a decoding process according to the present invention. In query 180, the decoder determines whether or not the decoder selects 3:2 pull-down content (e.g., 30 FPS). The encoder may explicitly encode a 24 FPS film sequence into a 30 FPS (or, equivalently, 60 fields per second) video sequence for transmission. If the decoder chooses to use 3:2 pull-down format (e.g., the decoder may be coupled to an interlaced display with a format and a frame rate compatible with those indicated in the bitstream) then, in step 190, the encoded video sequence may be directly decoded and presented on the display without using the flags such as, for example, top_field_first and repeat_first_field as in MPEG-2 Video. The interlaced format of the content is displayed in step 200. If the decoder chooses not to use the 3:2 pull-down format then, in step 210, the decoder detects and removes the isolated fields. The decoder may choose not to use the 3:2 pull-down format if, for example, the decoder is coupled to a progressive display, or if a display has a different format or frame rate from those indicated in the bitstream. Such isolated fields may be detected by the decoder since, for example, the field is isolated and the field is predicted from a previous frame. In step 220, the coded frames may then be displayed in a progressive format or the content may be converted to match the display which may be, for example, interlaced with a different size or a frame rate from the rate resulting from the use of the isolated fields.

Even when a different video encoding specification from MPEG-2 is used to compress the video, it may still be desirable to use the MPEG-2 Systems specification (e.g., Transport Stream) to transmit the encoded bit stream, due to the wide use of equipment implementing this specification and its proven performance and reliability. It may also be desirable to maintain current investments in the transmission and delivery infrastructure.

In accordance with the present invention, film material may be encoded with the indicated frame rate being the interlaced display frame rate (e.g., 30 FPS) without using flags such as, for example, top_field_first and repeat_first_field. The time-stamping process for the decoding time stamp (DTS) and the presentation time stamp (PTS) in MPEG-2 Systems may be slightly different than that for MPEG-2 Video. For MPEG-2 Video, DTS and PTS are typically generated for coded frames in the encoder by examining the corresponding film states. In an MPEG-2 decoder when encountering frames that do not have DTS and PTS coded, the decoding and presentation times generally are derived from the decoding and presentation times of previous frames in combination with the frame rate and the repeat_first_field flag. However, unlike MPEG-2 Video, in some embodiments according to the present invention, DTS and PTS may be generated for coded pictures in the encoder without knowing the film mode states of the pictures. Also, unlike MPEG-2 Video, in some embodiments according to the present invention, DTS and PTS may be generated for either coded frame pictures or field pictures in which the field picture may be isolated (e.g., not necessarily in pairs). When a decoder encounters a picture without DTS and PTS coded in the stream, the decoder can infer the correct decoding and presentation times for that picture from the decoding and presentation times of previous pictures (e.g., frame pictures or field pictures) in combination with only using frame rate or field rate, without using a repeat_first_field flag or the equivalent.

Unlike the MPEG-2 film mode flags, some embodiments according to the present invention do not complicate the video buffer model in the Hypothetical Reference Decoder portion of the video standard, since the frame rate and buffer removal times are consistent with or without the use of a film mode.

In some embodiments, the present invention may not indicate any field polarity of the frames when the isolated fields are included. The field polarity of all of the frames may be determined by the polarities of the isolated fields.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for facilitating a display of a video, the system comprising:
an encoder operable to encode a film material as a video with a field polarity and a 3:2 pull-down operation for an interlaced display format,
wherein the encoder is operable to insert an isolated field with the field polarity, and the encoder is operable to generate a time stamp for a particular picture without knowledge of a film mode state of the particular picture.

2. The system according to claim 1, wherein the encoder is operable to insert the isolated field between a first frame and a second frame to achieve 3:2 pull-down for coding the film material.

3. The system according to claim 1, wherein the encoder is operable to encode a 24 frames-per-second film sequence as a 30 frames-per-second video sequence for transmission.

4. The system according to claim 1, wherein the encoder is operable to encode the film material into a bitstream.

5. The system according to claim 4, wherein the bitstream comprises an alternate field polarity scheme.

6. The system according to claim 5, wherein a polarity of a field other than the isolated field is determined from at least the field polarity of the isolated field.

7. The system according to claim 1, wherein the encoder is operable to generate a decoding time stamp (DTS) or a presentation time stamp (PTS) for a particular picture without knowledge of a particular film mode state of the particular picture.

8. The system according to claim 1, wherein the encoder is operable to generate a DTS or a PTS for the inserted isolated field.

9. The system according to claim 1, further comprising: a decoder coupled to the encoder via a network.

10. The system of claim 1, wherein the encoder is operable to insert the isolated field with an indication of the field polarity of the isolated field.

11. The system of claim 1, wherein the encoder is operable to indicate field polarity of inserted isolated fields and not indicate polarity of fields associated with a frame.

12. The system of claim 1, wherein the inserted isolated field is predicted from at least a field of a frame immediately preceding the inserted isolated field.

13. A system for facilitating a display of a video, the system comprising:
an encoder operable to encode a film material as a video with a field polarity and a 3:2 pull-down operation for an interlaced display format, wherein the encoder is operable to insert an isolated field with the field polarity; and
a decoder coupled to the encoder via a network, wherein the decoder is operable to determine a decoding time or a presentation time for a particular picture based upon at least one DTS or at least one PTS for a previously decoded picture.

14. The system according to claim 13, wherein the decoder is operable to determine the decoding time or the presentation time for the particular picture using a particular frame rate or a particular field rate.

15. The system according to claim 14, wherein the particular frame rate or the particular field rate is indicated in a bitstream comprising encoded film material received from the encoder.

16. A system for facilitating a display of a video, the system comprising:
an encoder operable to encode a film material as a video with a field polarity and a 3:2 pull-down operation for an interlaced display format, wherein the encoder is operable to insert an isolated field with the field polarity; and
a decoder coupled to the encoder via a network, wherein the decoder is operable to detect and to remove the isolated field.

17. A system for facilitating a display of a video, the system comprising:
an encoder operable to encode a film material as a video with a field polarity and a 3:2 pull-down operation for an interlaced display format, wherein the encoder is operable to insert an isolated field with the field polarity; and
a decoder coupled to the encoder via a network, wherein the decoder is operable to decode and to present a video sequence without using a film mode flag.

18. A method for facilitating a display of a video, comprising:
encoding a source material as a video material with a field polarity and a 3:2 pull-down operation for an interlaced display format;
wherein the encoding comprises:
inserting an isolated field with the field polarity between two frames to achieve 3:2 pull-down for coding the source material; and
encoding the source material without specific knowledge concerning film mode states of the source material.

19. The method according to claim 18, wherein a polarity of a field other than the isolated field is determined based upon at least the field polarity of the isolated field.

20. The method according to claim 18, further comprising:
encoding progressive content with one or more of the isolated fields for conversion into the interlaced display format.

21. The method according to claim 18, wherein the encoded source material forms a bitstream.

22. The method according to claim 18, further comprising:
generating a time stamp for a coded frame or a coded field.

23. The method according to claim 18, further comprising: detecting and removing the isolated field.

24. A method for facilitating a display of a video, the method comprising:
encoding a source material as a video material with a field polarity and a 3:2 pull-down operation for an interlaced display format, wherein the encoding comprises inserting an isolated field with the field polarity between two frames to achieve 3:2 pull-down for coding the source material and
determining a time stamp for a particular coded picture based upon a value of a previous time stamp of a previous coded picture.

25. The method according to claim 24, further comprising:
determining a time stamp for a particular coded picture based upon a frame rate or a field rate.

26. The method according to claim 25, further comprising:
indicating the frame rate or the field rate in a bitstream comprising the encoded source material.

27. A method for facilitating a display of a video, the method comprising:
    encoding a source material as a video material with a field polarity and a 3:2 pull-down operation for an interlaced display format, wherein the encoding comprises inserting an isolated field with the field polarity between two frames to achieve 3:2 pull-down for coding the source material; and
    providing a time stamp for a particular picture without knowledge of a film mode state of the particular picture.

28. A method for facilitating a display of a video, the method comprising:
    encoding a source material as a video material with a field polarity and a 3:2 pull-down operation for an interlaced display format, wherein the encoding comprises inserting an isolated field with the field polarity between two frames to achieve 3:2 pull-down for coding the source material; and
    decoding and presenting a video sequence without using a film mode flag.

29. A system for facilitating a display of a video, the system comprising:
    an encoder operable to encode a film material as a video with a field polarity and a 3:2 pull-down operation for an interlaced display format, wherein:
    the encoder is operable to insert an isolated field with the field polarity;
    and
    the encoder is operable to encode the film material such that the frame rate and buffer removal times are consistent with or without the use of a film mode.

* * * * *